United States Patent
Girotti et al.

(10) Patent No.: US 10,113,026 B2
(45) Date of Patent: Oct. 30, 2018

(54) FOAM FORMULATIONS

(71) Applicant: Dow Global Technologies LLC, Midland, MI (US)

(72) Inventors: Cecilia Girotti, Correggio (IT); Paolo Golini, Correggio (IT); Giuseppe Vairo, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/533,440

(22) PCT Filed: Dec. 21, 2015

(86) PCT No.: PCT/US2015/067033
§ 371 (c)(1),
(2) Date: Jun. 6, 2017

(87) PCT Pub. No.: WO2016/106188
PCT Pub. Date: Jun. 30, 2016

(65) Prior Publication Data
US 2017/0342190 A1    Nov. 30, 2017

(30) Foreign Application Priority Data
Dec. 22, 2014   (IT) .............................. MI2014A2200

(51) Int. Cl.
| | | |
|---|---|---|
| *C08G 18/18* | (2006.01) | |
| *C08J 9/00* | (2006.01) | |
| *C08J 9/14* | (2006.01) | |
| *C08G 18/76* | (2006.01) | |
| *C08G 18/48* | (2006.01) | |
| *C08G 101/00* | (2006.01) | |

(52) U.S. Cl.
CPC ..... *C08G 18/1808* (2013.01); *C08G 18/1816* (2013.01); *C08G 18/482* (2013.01); *C08G 18/7664* (2013.01); *C08J 9/0028* (2013.01); *C08J 9/141* (2013.01); *C08G 2101/0025* (2013.01); *C08J 2201/022* (2013.01); *C08J 2203/14* (2013.01); *C08J 2205/10* (2013.01); *C08J 2375/04* (2013.01)

(58) Field of Classification Search
CPC ............ C08G 18/1808; C08G 18/1816; C08G 18/482; C08G 18/7664; C08G 2101/0025; C08J 9/0028; C08J 9/141; C08J 2201/022; C08J 2203/14; C08J 2205/10; C08J 2375/04
See application file for complete search history.

(56) References Cited

U.S. PATENT DOCUMENTS

| | | |
|---|---|---|
| 3,438,986 A | 4/1969 | Kaiser et al. |
| 6,281,393 B1 | 8/2001 | Molina et al. |
| 2008/0255262 A1 | 10/2008 | De Vos et al. |
| 2012/0004334 A1* | 1/2012 | Kramer .............. C08G 18/4018 521/88 |
| 2013/0123378 A1 | 5/2013 | Yabuno et al. |
| 2013/0136931 A1 | 5/2013 | James et al. |
| 2014/0213677 A1 | 7/2014 | Jimenez et al. |
| 2016/0002427 A1 | 1/2016 | Pignagnoli et al. |

FOREIGN PATENT DOCUMENTS

| | | |
|---|---|---|
| WO | 0158976 | 8/2001 |
| WO | 2015110404 | 7/2015 |

OTHER PUBLICATIONS

International Search Report and Written Opinion for related PCT Application PCT/US2015/067033, dated Mar. 17, 2016 (14 pgs).
2nd Written Opinion for related PCT Application PCT/US2015/067033, dated Nov. 11, 2016 (7 pgs).

* cited by examiner

*Primary Examiner* — John M Cooney
(74) *Attorney, Agent, or Firm* — Brooks, Cameron & Huebsch, PLLC

(57) ABSTRACT

Embodiments of the present disclosure are foam formulations. As an example, foam formulation can include a polyol composition having an amine-imitated polyol that is from 10 percent to 20 percent of a total weight of the polyol composition and an additional polyol that is from 80 percent to 90 percent of the total weight of the polyol composition, a polyisocyanate, a blowing catalyst, and a gel catalyst, where a combination of the blowing catalyst and the gel catalyst is from 0.5 percent to 1.5 percent the total weight of the polyol composition and where the blowing catalyst is from 50 percent to 100 percent of a total weight of the blowing catalyst and the gel catalyst.

9 Claims, No Drawings

FOAM FORMULATIONS

This application is a National Stage Application under 35 U.S.C. § 371 of International Application Number PCT/US2015/067033, filed Dec. 21, 2015 and published as WO 2016/106188 on Jun. 30, 2016, which claims the benefit to Italian Application Number MI2014A002200, filed Dec. 22, 2014, the entire contents of which are incorporated herein by reference in its entirety.

FIELD OF DISCLOSURE

Embodiments of the present disclosure are directed towards foam formulations, more specifically, embodiments are directed towards foam formulations that can be utilized to form rigid polyurethane foams.

BACKGROUND

Foams are dispersions in which a gas is dispersed in a liquid material, a solid material, or a gel material. Rigid polyurethane foams are used for a variety of applications. For instance, rigid polyurethane foams can be utilized the appliance industry, as well as the building industry, among others. For some applications, rigid polyurethane foams may be utilized to provide thermal insulation, among other properties.

SUMMARY

The present disclosure provides a foam formulation including a polyol composition having an amine-imitated polyol that is from 10 percent to 20 percent of a total weight of the polyol composition and an additional polyol that is from 80 percent to 90 percent of the total weight of the polyol composition, a polyisocyanate, where the foam formulation has an isocyanate index in a range from 70 to 500, a blowing agent, a blowing catalyst, and a gel catalyst, where a combination of the blowing catalyst and the gel catalyst is from 0.5 percent to 1.5 percent the total weight of the polyol composition and where the blowing catalyst is from 50 percent to 100 percent of a total weight of the blowing catalyst and the gel catalyst.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Foam formulations and rigid polyurethane foams formed therefrom are disclosed herein. Polyurethanes are polymers including chains of units joined by carbamate links, which may be referred to as urethane links. Polyurethanes can be formed by reacting polyisocyanates with a polyol. Rigid polyurethane foams include closed cells. For closed-cell foams, such as rigid polyurethane foams, a gas can forms discrete pockets, where the discrete pockets are completely surrounded by the solid material, e.g., the polyurethane. The closed cells may be referred to as non-intercommunicating. Because the discrete pockets are surrounded by the solid material, the closed cells form a rigid material, e.g., a rigid foam.

As mentioned the foam formulations disclosed herein may be utilized to form rigid polyurethane foams. These rigid polyurethane foams can have properties that are desirable for various applications. For instance, embodiments of the present disclosure provide that the rigid polyurethane foams can have a thermal conductivity of less than 20 milliwatts/meter kelvin and an average cell diameter of less than 250 microns. The rigid polyurethane foams having these properties can be formed from the foam formulations disclosed herein, which include a reduced amount of a combination of blowing catalyst and the gel catalyst, as compared to previous foam formulations. For instance, embodiments of the present disclosure provide that a combination of a blowing catalyst and a gel catalyst is from 0.5 percent to 1.5 percent a total weight of a polyol composition of the foam formulation, where the blowing catalyst is from 50 percent to 100 percent of a total weight of the blowing catalyst and the gel catalyst. Surprisingly, the foam formulations disclosed herein can provide improved curing, e.g. a faster curing, among other benefits as compared to other foam formulations. This faster curing is surprising because the foam formulations disclosed herein can include a reduced amount of gel catalyst relative to blowing catalyst, as compared other foam formulations. Faster curing can help to reduce a production time of rigid polyurethane foams, for instance.

The foam formulations disclosed herein include a polyol composition. As used herein, "polyol" refers to a molecule having an average of greater than 1.0 hydroxyl groups per molecule.

Embodiments of the present disclosure provide that the polyol composition includes an amine-imitated polyol that is from 10 percent to 20 percent of a total weight of the polyol composition. All individual values and subranges from 10 percent to 20 percent of a total weight of the polyol composition are included; for example, the amine-imitated polyol can be from a lower limit that is from 10 percent, 11 percent, or 12 percent of a total weight of the polyol composition to an upper limit of 20 percent, 19 percent, or 18 percent of the total weight of the polyol composition. Embodiments of the present disclosure provide that the amine-initiated polyol can contain at least two reactive hydrogen atoms. As used herein "a" and "an" refer to one or more.

The amine-initiated polyol can have a nominal functionality of from 2 to 8. All individual values and subranges from 2 to 8 are included; for example, the amine-initiated polyol can have a nominal functionality of from 3 to 8, 2 to 7, or 3 to 7. The amine-initiated polyol can have an average hydroxyl number from 200 to 850. All individual values and subranges from 200 to 850 are included; for example, the amine-initiated polyol can have an average hydroxyl number that is from a lower limit of 200, 250, or 300 to and upper limit of 850, 800, or 750. While not being bound to theory, the amine-initiated polyol, due to the presence of nitrogen atoms, may have catalytic activity, mainly with respect to foam curing, and may have an influence on the blowing reaction.

Some embodiments of the present disclosure provide that the polyol composition can have a viscosity at 25° C. in a range from 500 centipoise to 20000 centipoise, as measured according to ASTM D455. All individual values and subranges from 500 centipoise to 20000 centipoise are included; for example, the polyol composition have viscosity at 25° C.

that is from a lower limit of 500, 550, or 600 to an upper limit of 20000, 19000, or 18000.

The polyol composition can include an additional polyol, e.g., one or more polyols other than the amine-initiated polyol. The additional polyol can be from 80 percent to 90 percent of a total weight of the polyol composition. All individual values and subranges from 80 percent to 90 percent of a total weight of the polyol composition are included; for example, the additional polyol can be from a lower limit that is from 80 percent, 81 percent, or 82 percent of a total weight of the polyol composition to an upper limit of 90 percent, 89 percent, or 88 percent of the total weight of the polyol composition.

Examples of the additional polyol include, but are not limited to, polythio-ether-polyols, polyester-amides, hydroxyl-containing polyacetals and hydroxyl-containing aliphatic polycarbonates, and combinations thereof. Some embodiments of the present disclosure provide that the additional polyol includes a polyester-polyol and/or a polyether-polyol. Some embodiments of the present disclosure provide that the additional polyol includes a mixture of at least two of the above-mentioned polyols with polyhydroxyl compounds having hydroxyl numbers of less than 100.

The amine-initiated polyol and/or the additional polyol can be formed by a known process. Additionally, the amine-initiated polyol and/or the additional polyol may be obtained commercially. An example the amine-initiated polyol is TERCAROL™ 5902, available from The Dow Chemical Company, among others. Examples of commercially available additional polyols include VORANOL™ RN 482, VORANOL™ CP 1055, and VORANOL™ RA 640, each available from The Dow Chemical Company, among others.

Polyester-polyols may be prepared from, for example, organic dicarboxylic acids having from 2 to 12 carbon atoms, preferably aromatic dicarboxylic acids having from 8 to 12 carbon atoms and polyhydric alcohols, preferably diols having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid and the isomeric naphthalene-dicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some embodiments of the present disclosure provide that preference is given to dicarboxylic acid mixtures including succinic acid, glutaric acid and adipic acid in ratios of, for example, from 20 to 35:35 to 50:20 to 32 parts by weight, and adipic acid, and in particular mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some embodiments of the present disclosure provide that preference reference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., ω-hydroxycaproic acid and hydrobenzoic acid, may also be employed.

Some embodiments of the present disclosure provide that polyester-polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or preferably in the presence of an esterification catalyst, expediently in an inert gas atmosphere, e.g., nitrogen, carbon monoxide, helium, argon, inter alia, in the melt at from about 150 to about 250° C., preferably from 180 to 220° C., at atmospheric pressure or under reduced pressure until a desired acid number, which can be less than 10, and in some instances preferably less than 2, is reached. Some embodiments of the present disclosure provide that the esterification mixture is polycondensed at the abovementioned temperatures under atmospheric pressure and subsequently under a pressure of less than 500 millibar, e.g., from 50 to 150 mbar, until an acid number of from 80 to 30, e.g., from 40 to 30, has been reached. Examples of suitable esterification catalysts include, but are not limited to iron, cadmium, cobalt, lead, zinc, antimony, magnesium, titanium and tin catalysts in the form of metals, metal oxides or metal salts. Polycondensation may also be carried out in a liquid phase in the presence of diluents and/or entrainers, e.g., benzene, toluene, xylene or chlorobenzene, for removal of the water of condensation by azeotropic distillation, for instance.

Polyester-polyols can be prepared by polycondensing organic polycarboxylic acids and/or derivatives thereof with polyhydric alcohols in a molar ratio of from 1:1 to 1:1.8, e.g., from 1:1.05 to 1:1.2. The polyester-polyols can have a nominal functionality of from 2 to 3 and a hydroxyl number of from 150 to 600, e.g., from 200 to 400.

Some embodiments of the present disclosure provide that anionic polymerization may be utilized. For instance, alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8, e.g., 3 to 8, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety may be utilized.

Examples of suitable alkylene oxides include, but are not limited to, tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. Examples of suitable initiator molecules include, but are not limited to, water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylenediamine, aniline, cyclohexanediamine, phenylenediamines, 2,3-, 2,4-, 3,4- and 2,6-tolylenediamine and 4,4'-, 2,4'- and 2,2'-diaminodiphenylmethane. Other suitable initiator molecules include alkanolamines, e.g., ethanolamine, N-methyl- and N-ethylethanolamine, dialkanolamines, e.g., diethanolamine, N-methyl- and N-ethyldiethanolamine, and trialkanolamines, e.g., triethanolamine, and ammonia, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

Some embodiments of the present disclosure provide that the additional polyol can include polyether-polyols having a nominal functionality of from 2 to 8 and a hydroxyl number of from 100 to 850 and are prepared by anionic polyaddition of at least one alkylene oxide, e.g., ethylene oxide or 1,2-propylene oxide or 1,2-propylene oxide and ethylene oxide, onto, as initiator molecule, at least one aromatic compound containing at least two reactive hydrogen atoms and containing at least one hydroxyl, amino and/or carboxyl group. Examples of initiator molecules include aromatic polycarboxylic acids, for example, hemimellitic acid, trimellitic acid, trimesic acid and preferably phthalic acid, isophthalic acid and terephthalic acid, or mixtures of at least two polycarboxylic acids, hydroxycarboxylic acids, for example, salicylic acid, p- and m-hydroxybenzoic acid and gallic acid, aminocarboxylic acids, for example, anthranilic acid, m- and p-aminobenzoic acid, polyphenols, for example, resorcinol, and according to some embodiments of the present disclosure, preferably dihydroxydiphenylmethanes and dihydroxy-2,2-diphenylpropanes, Mannich condensates of phenols, formaldehyde and dialkanolamines, preferably diethanolamine, and preferably aromatic polyamines, for example, 1,2-, 1,3- and 1,4-phenylenediamine and in particular 2,3-, 2,4-, 3,4- and 2,6-tolylenediamine, 4,4'-, 2,4'- and 2,2'-diamino-diphenylmethane, polyphenyl-polymethylene-polyamines, mixtures of diaminodiphenylmethanes and polyphenyl-polymethylene-polyamines, as formed, for example, by condensation of aniline with formaldehyde, and mixtures of at least two polyamines.

Examples of hydroxyl-containing polyacetals include compounds which may be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Examples of hydroxyl-containing polycarbonates can be prepared, for example, by reacting diols, such as 1,3-propanediol, 1,4-butanediol and/or 1,6-hexanediol, diethylene glycol, triethylene glycol or tetraetlaylene glycol, with diaryl carbonates, e.g., diphenyl carbonate, or phosgene.

Polyester-amides include, for example, predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

In a number of embodiments of the present disclosure, the polyol composition may include a mixture of polyether-polyols containing at least one polyether-polyol based on an aromatic, polyfunctional initiator molecule and at least one polyether-polyol based on a nonaromatic initiator molecule, preferably a trihydric to octahydric alcohol. As noted hereinabove, an amine-initiated polyol is from 10 percent to 20 percent of a total weight of the polyol composition.

The foam formulations disclosed herein include a polyisocyanate. As used herein, "polyisocyanate" refers to a molecule having an average of greater than 1.0 isocyanate groups per molecule.

The polyisocyanate can include an aliphatic polyisocyanate, a cycloaliphatic polyisocyanate, an araliphatic polyisocyanate, an aromatic polyisocyanate, or combinations thereof. Examples of polyisocyanates include, but are not limited to, alkylene diisocyanates such as 1,12-dodecane diisocyanate; 2-ethyltetramethylene 1,4-diisocyanate; 2-methyl-pentamethylene 1,5-diisocyanate; 2-ethyl-2-butyl-pentamethylene 1,5-diisocyanate; tetramethylene 1,4-diisocyanate; and hexamethylene 1,6-diisocyanate. Examples of polyisocyanates include, but are not limited to cycloaliphatic diisocyanates, such as cyclohexane 1,3- and 1,4-diisocyanate and mixtures of these isomers; 1-isocyanato-3,3,5-trimethyl-5-isocyanato-methylcyclohexane; 2,4- and 2,6-hexahydrotolylene diisocyanate; and the corresponding isomer mixtures, 4,4-, 2,2'- and 2,4'-dicyclohexylmethane diisocyanate; and corresponding isomer mixtures. Examples of polyisocyanates include, but are not limited to, araliphatic diisocyanates, such as 1,4-xylylene diisocyanate and xylylene diisocyanate isomer mixtures. Examples of polyisocyanates include, but are not limited to, aromatic polyisocyanates, e.g., 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MIDI and tolylene diisocyanates. The polyisocyanate may be employed individually or in the form of combinations thereof.

Some embodiments of the present disclosure provide that a modified polyisocyanate may be used utilized. Examples of modified polyisocyanates include, but are not limited, to ester-, urea-, biuret-, allophanate-, uretoneirnine-, carbodiimide-, isocyanurate-, uretdione- and/or urethane-containing polyisocyanates. Specific examples include urethane-containing organic, preferably aromatic, polyisocyanates containing from 33.6 to 15 percent by weight, preferably from 31 to 21 percent by weight, of NCO, based on the total weight. Examples include 4,4'-diphenylmethane diisocyanate, 4,4'- and 2,4'-diphenylmethane diisocyanate mixtures, or crude MDI or 2,4- or 2,6-tolylene diisocyanate, in each case modified by means of low molecular weight diols, triols, dialkylene glycols, trialkylene glycols or polyoxyalkylene glycols having molecular weight of up to about 6,000. Specific examples of di- and polyoxyalkylene glycols, which may be employed individually or as mixtures, include diethylene, dipropylene, polyoxyethylene, polyoxypropylene and polyoxy-propylene-polyoxyethylene glycols, triols and/or tetrols. NCO-containing prepolymers containing from 25 to 3.5 percent by weight, e.g., from 21 to 14 percent by weight, of NCO, based on the total weight, and prepared from the polyester- and/or preferably polyether-polyols described herein, and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15 percent by weight, e.g., from 31 to 21 percent by weight, of NCO, based on the total weight, e.g., based on 4,4'-, 2,4'- and/or 2,2'-diphenylmethane diisocyanate and/or 2,4' and/or 2,6-tolylene diisocyanate, may also be utilized. Modified polyisocyanates may be mixed with one another or with unmodified organic polyisocyanates, e.g., 2,4'- or 4,4'-diphenylmethane diisocyanate, crude MDI, and/or 2,4- and/or 2,6-tolylene diisocyanate.

Some embodiments of the present disclosure provide that polyisocyanates may include mixtures of modified organic polyisocyanates containing urethane groups, having an NCO content of from 33.6 to percent by weight, in particular those based on tolylene diisocyanates, 4,4'-diphenylmethane diisocyanate, diphenylmethane diisocyanate isomer mixtures or crude MDT, in particular 2,4'- and 2,2'-diphenylmethane diisocyanate, polyphenyl-polymethylene polyisocyanates, 2,4- and 2,6-tolylene diisocyanate, crude MDI having a diphenylmethane diisocyanate isomer content of from about 30 to about 80 percent by weight, e.g., from about 35 to about 45 percent by weight, and mixtures of at least two of the above-indicated polyisocyanates, for example, crude MDI or mixtures of tolylene diisocyanates and crude MDI.

The polyisocyanate may be prepared, e.g., by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The polyisocyanate may be obtained commercially. Examples of commercial polyisocyanates include, but are not limited to, polyisocyanates sold under the trade name VORATEC™, such as VORATEC™ SD100, a polymeric methylene diphenyl diisocyanate (MDI) available from The Dow Chemical Company.

Some embodiments of the present disclosure provide that the foam formulation can have an isocyanate index from 70 to 500. All individual values and subranges from 70 to 500 are included; for example, the foam formulation can have an isocyanate index from a lower limit of 70, 80, 90, or 100 to an upper limit of 500, 250, 150, or 130.

The foam formulation can include a blowing catalyst and a gel catalyst. Catalysts, e.g., blowing catalysts and gel catalysts, may be differentiated by a tendency to favor either the urea (blow) reaction, in the case of the blowing catalyst, or the urethane (gel) reaction, in the case of the gel catalyst.

Examples of blowing catalysts, e.g., catalyst that can tend to favor the blow reaction include, but are not limited to, short chain tertiary amines or tertiary amines containing an oxygen. For instance, blowing catalysts include bis-(2-dimethylaminoetlaypether; pentamethyldiethylene-triamine, trietlaylamine, tributyl amine, N,N-dimethylarninopropylarnine, dimethylethanolamine, N,N,N',N'-tetra-methylethylenediamine, and combinations thereof, among others.

Examples of gel catalysts, e.g., catalyst that can tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gel catalyst, such as, for example, bismuth octanoate. Cyclic tertiary amines and/or long chain amines include dimethylbenzylamine, N,N,N',N'-tetramethylbutanediamine, dimethylcyclohexylamine, triethylenediamine, and combinations thereof, and combinations thereof. Some examples of the present disclosure provide that nitrogen atoms of the gel catalyst are not part of a molecular cyclic structure.

As mentioned, embodiments of the present disclosure provide that a combination of the blowing catalyst and the gel catalyst is from 0.5 percent to 1.5 percent of a total weight of the polyol composition. All individual values and subranges from 0.5 percent to 1.5 percent are included; for example, the combination of the blowing catalyst and the gel catalyst can be from a lower limit of 0.5, 0.6, or 0.7 percent to an upper limit of 1.5, 1.4, or 1.3 percent of the total weight of the polyol composition.

Embodiments of the present disclosure provide that the blowing catalyst is from 50 percent to 100 percent of a total weight of the blowing catalyst and the gel catalyst. All individual values and subranges from 50 percent to 100 percent are included; for example, the blowing catalyst can be from a lower limit of 50, 55, or 60 percent to an upper limit of 100, 95, 90, 85, or 80 percent of a total weight of the blowing catalyst and the gel catalyst.

As mentioned, surprisingly, the foam formulations disclosed herein can provide improved curing, e.g. a faster curing, among other benefits as compared to other foam formulations. This faster curing is surprising because the foam formulations disclosed herein can include a reduced amount of gel catalyst relative to blowing catalyst, as compared other foam formulations. Faster curing can help to reduce a production time of rigid polyurethane foams, for instance.

The foam formulation can include a blowing agent. The blowing agent can be a physical blowing agent, a chemical blowing agent, or combinations thereof.

Physical blowing agents can be utilized to help foam the foam formulation, which may enhance a thermal insulation capability of a rigid polyurethane foam formed therefrom. Examples of physical blowing agents include liquid carbon dioxide; alkanes; cycloalkanes, such as, cyclopentane, cyclohexane, cyclobutane and mixtures thereof other cycloalkanes having a maximum of 4 carbon atoms; dialkyl ethers, cycloalkylene ethers, fluoroalkanes, and mixtures thereof. Examples of alkanes include propane, n-butane, isobutane, isopentane and mixtures thereof. Examples of dialkyl ethers include dimethyl ether, methyl ethyl ether, methyl butyl ether, diethyl ether, and combinations thereof. An example of a cycloalkylene ether is furan. Examples of fluoroalkanes include trifluoromethane, difluoromethane, difluoroethane, tetrafluoroethane, hepta-fluoropropane, and combinations thereof.

The physical blowing agent can be from 2 to 25 parts by weight of the foam formulation, based on 100 parts of the polyol composition. All individual values and subranges from 2 to 25 parts by weight are included; for example, the physical blowing agent can be from a lower limit of 2, 5, or 8 parts by weight to an upper limit of 25, 23, or 20 parts by weight based on 100 parts of the polyol composition.

Chemical blowing agents can be utilized to form carbon dioxide from a reaction with the polyisocyanate, for instance. An example the chemical blowing agent is water. Some embodiments of the present disclosure provide that the chemical blowing agent, when utilized, be from 0.3 percent to 2.0 percent of a total weight of the polyol composition. All individual values and subranges from 0.3 percent to 2.0 percent are included; for example, the chemical blowing agent can be from a lower limit of 0.3, 0.4, or 0.5 percent to an upper limit of 2.0, 1.8, or 1.6 percent of a total weight of the polyol composition. Some embodiments of the present disclosure provide that carbon dioxide may also be utilized via adducts of carbon dioxide, such as carbamates, which may be added to the foam formulations.

Some embodiments of the present disclosure provide that the foam formulation can include a trimerization catalyst. The trimerization catalyst may be utilized to promote reactivity of the foam formulation. Examples of trimerization catalysts include tris(dialkylarninoalkyl)-s-hexahydrotriazines, such as 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof. Some commercially available trimerization catalysts include DABCO® TMR-30, DABCO® K 2097; DABCO® K15, POLYCAT® 41, POLYCAT® 43, POLYCAT® 46, DABCO® TMR, CURITHANE 52, among others. Some embodiments of the present disclosure provide that the trimerization catalyst, when utilized, is from 0.1 percent to 1.5 percent of a total weight of the polyol composition. All individual values and subranges from 0.1 percent to 1.5 percent are included; for example, the trimerization catalyst can be from a lower limit of 0.1, 0.2, or 0.3 percent to an upper limit of 1.5, 1.3, or 1.0 percent of a total weight of the polyol composition.

Some embodiments of the present disclosure provide that the foam formulation can include a surfactant. The surfactant may help to emulsify components of the foam formulation, regulate cell size of a resultant foam, and/or stabilize a cell structure to help prevent collapse and/or sub-surface voids. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates and VORASURF™ 504, which is an ethylene oxide/butylene oxide block co-polymer having a relatively high molecular weight, and combinations thereof. Surfactants are available commercially and include those available under trade names such as DABCO™ and TEGOSTAB™. Some embodiments of the present disclosure provide that surfactant, when utilized, is from 0.1 percent to 2.5 percent of a total weight of the polyol composition. All individual values and subranges from 0.1 percent to 1.5 percent are included; for example, the surfactant can be from a lower limit of 0.1, 0.2, or 0.3 percent to an upper limit of 1.5, 1.3, or 1.0 percent of a total weight of the polyol composition.

Some embodiments of the present disclosure provide that the foam formulation can include one or more additional components. Different additional components and/or different amounts of the additional components may be utilized for various applications. Examples of additional components include pigments, colorants, flame-retardants, crosslinkers, chain extenders, antioxidants, surface modifiers, bioretardant agents, mold release agents, and combinations thereof, among others.

Some embodiments of the present disclosure provide a method for forming a foam formulation. A method for forming a foam formulation can include forming a polyol composition by combining an amine-initiated polyol and an additional polyol, wherein the amine-initiated polyol is from 10 percent to 20 percent of a total weight of the polyol composition and the additional polyol that is from 80 percent to 90 percent of the total weight of the polyol composition, as discussed herein. The method for preparing a foam formulation can include combining the polyol composition with a polyisocyanate to provide an isocyanate index in a range from 70 to 500, a blowing agent, a blowing catalyst, and a gel catalyst, wherein a combination of the blowing catalyst and the gel catalyst is from 0.5 percent to 1.5 percent the total weight of the polyol composition and wherein the blowing catalyst is from 50 percent to 100 percent of a total weight of the blowing catalyst and the gel catalyst, as discussed herein.

As mentioned, the foam formulations disclosed herein can be utilized to form rigid polyurethane foams. Some embodiments of the present disclosure provide that the foam formulation can be introduced into a mold, e.g., a cavity, to produce a rigid polyurethane foam. For instance, the polyol composition can be combined with components, such as, the blowing catalyst, the gel catalyst, physical blowing agents, water, crosslinkers, and/or chain extenders, surfactant, and any additional components to form a "B" side, which in Europe may be referred to as the "A" side. This "B" side can be contacted with an "A" side, which in Europe may be referred to as the "B" side, that includes the polyisocyanate to begin the foaming and polymerization reactions. The A side and the B side can be combined to provide the isocyanate index discussed herein.

Different equipment, such as mixers and/or sprayers, among others, can be utilized for various applications. For instance, a mixing injection head, where the A side and the B side are combined and mixed and then, more or less simultaneously, injected into the mold or cavity to be filled can be utilized for some applications. A "one shot" injection, where the mold or cavity is filled from a single injection point while simultaneously drawing a vacuum from another point, can be utilized for some applications. The vacuum may help to facilitate filling of a mold, e.g. prior to a gel time of the foam formulation, which in some embodiments of the present disclosure may be from 30 seconds to 150 seconds, for example. All individual values and subranges from 30 seconds to 150 seconds are included; for example, foam formulation can have a gel time from a lower limit of 30, 33, or 35 seconds to an upper limit of 150, 145, or 140 seconds.

As mentioned, some embodiments of the present disclosure provide that a vacuum can be utilized to form the rigid polyurethane foams disclosed herein. The vacuum can be utilized to provide a reduced atmospheric pressure. The vacuum, e.g. the reduced atmospheric pressure, can be from 350 to about 950 millibars. All individual values and subranges from 350 to about 950 millibars are included; for example, the reduced atmospheric pressure can be from a lower limit of 350, 375, or 400 millibars to an upper limit of 950, 925, or 900 millibars.

Some embodiments of the present disclosure provide that the vacuum can be maintained for a time interval of at least 180 seconds. For instance, the foam formulation can be injected into a mold and thereafter a vacuum applied to the mold can be maintained for a time interval of at least 180 seconds. Some embodiments of the present disclosure provide that the time interval can be from a lower limit of 180 seconds, 240 seconds, or 300 seconds to an upper limit of 600 seconds, 900 seconds, or 1200 seconds.

The rigid polyurethane foams disclosed herein can be formed at a temperature from 15° C. to 85° C. All individual values and subranges from 15° C. to 85° C. are included; for example, the rigid polyurethane foams can be formed at a temperature from a lower limit of 15° C., 20° C., or 25° C. to an upper limit of 85° C., 75° C., or 65° C.

The rigid polyurethane foams disclosed herein can have density, measured according to ASTM 1622-88, from 20 kg/m³ to 45 kg/m³. All individual values and subranges from 20 kg/m³ to 45 kg/m³ are included; for example, the rigid polyurethane foams can have a density from a lower limit of 20 kg/m³, 23 kg/m³, or 25 kg/m³ to an upper limit of 45 kg/m³, 43 kg/m³, or 40 kg/m³.

Some embodiments of the present disclosure provide that the rigid polyurethane foams can have from 65 percent to 98 percent closed cells. All individual values and subranges from 65 percent to 98 percent closed cells are included; for example, the rigid polyurethane foams can have from a lower limit of 65 percent, 70 percent, or 75 percent to an upper limit of 98 percent, 95 percent, or 90 percent closed cells.

Some embodiments of the present disclosure provide that the rigid polyurethane foams can have a thermal conductivity, at 10° C. average plate temperature, according to ISO 12939/DIN 52612, from 15 to 20 milliwatts/meter kelvin. All individual values and subranges from 15 to 20 milliwatts/meter kelvin are included; for example, the rigid polyurethane foams can have a thermal conductivity from a lower limit of 15, 16, or 17 milliwatts/meter kelvin to an upper limit of 20, 19.8, or 19.7 milliwatts/meter kelvin.

Some embodiments of the present disclosure provide that the rigid polyurethane foams can have an average cell diameter from 175 microns to 250 microns. All individual values and subranges from 175 microns to 250 microns are included; for example, the rigid polyurethane foams can an average cell diameter from a lower limit of 175, 180, or 190 microns to an upper limit of 250, 245, or 240 microns.

The rigid polyurethane foams disclosed herein can be utilized for a variety of applications, such as in appliance insulating walls for uses such as, refrigerators, freezers, and hot water storage tanks, as well as building applications, among others.

EXAMPLES

In the Examples, various terms and designations for materials are used including, for instance, the following:

VORANOL™ RN 482 (additional polyol, available from The Dow Chemical Company); TERCAROL™ 5902 (amine-initiated polyol, available from The Dow Chemical Company); VORANOL™ CP 1055 (additional polyol, available from The Dow Chemical Company); Tris (1-chloro-2-propyl) phosphate (flame retardant, available from SinoHarvest); POLYCAT® 8 (dimethylcyclohexylamine, gel catalyst, available from Air Products & Chemicals Inc.); POLYCAT® 5 (pentamethyldiethylene-triamine, blowing catalyst, available from Air Products & Chemicals Inc.), DABCO® TMR-30 (trimerization catalyst, available from Air Products & Chemicals Inc.); TEGOSTAB® B 8496 (surfactant, available from Evonik Industries); cyclopentane (blowing agent, 95% cyclopentane available from Halterman); VORANOL™ RA 640 (additional polyol, available from The Dow Chemical Company). VORATEC™ SD100 (polyisocyanate, polymeric MDI, available from The Dow Chemical Company).

Example 1, a foam formulation, was formed by utilizing amounts of components listed in Table 1. Examples 2-3, foam formulations, were prepared as Example 1. However, Examples 2-3 utilized amounts of components as listed in Table 1.

For Example 1, a combination of the blowing catalyst and the gel catalyst was 1.200 percent of the total weight of the polyol composition; the blowing catalyst was 80 percent of a total weight of the blowing catalyst and the gel catalyst; and Example 1 had an isocyanate index of 119. For Example 2, a combination of the blowing catalyst and the gel catalyst was 1.151 percent of the total weight of the polyol composition; the blowing catalyst was 65.22 percent of a total weight of the blowing catalyst and the gel catalyst; and Example 2 had an isocyanate index of 119. For Example 3, a combination of the blowing catalyst and the gel catalyst was 1.032 percent of the total weight of the polyol composition; the blowing catalyst was 100 percent of a total weight of the blowing catalyst and the gel catalyst; and Example 3 had an isocyanate index of 119.

The temperature of the components was maintained at 20° C. (+/−2° C.). Example 1 was prepared with a high pressure Cannon S 20 laboratory machine having a mix-head attached to a mold injection hole. The mold/mix-head connection was air-tight. The components utilized to prepare Example 1, other than the isocyanate, were premixed. The premixed components and the isocyanate were combined to form Example 1; the premixed components and the isocyanate were simultaneously injected into an aluminum Brett mold at a mix-head pressure of approximately 130-140 bar. The Brett mold was 200 cm long, 20 cm wide and 5 cm deep and maintained at about 45° C. A release agent was applied to the Brett mold prior to injection to facilitate demolding. The Brett mold had no venting, to provide a reduced atmospheric pressure of 900 mbar in the mold during foaming. Internal pressure of the mold was controlled via a pipe connected to a 500 liter buffer tank that was connected to a vacuum pump (capacity 1500 liters/minute). Vacuum in the buffer tank, and the in-mold pressure, was maintained with control valves. Example 1 was maintained in the Brett mold for a period of time to undergo foaming and form a foam panel that is Example 4, a rigid polyurethane foam. Examples 5-6, rigid polyurethane foams, were formed as Example 4. However, Examples 5-6 utilized Examples 2-3, respectively, in place of Example 1.

Comparative Examples A-F were prepared as Example 1. However, Comparative Examples A-F utilized amounts of components as listed in Table 2. Each of Comparative Examples A-F was maintained in the Brett mold for a period of time to undergo foaming and form a respective foam panel that are Comparative Examples G-L, where Comparative Example A was utilized to form Comparative Example G, Comparative Example B was utilized to form Comparative Example H, Comparative Example C was utilized to form Comparative Example 1, Comparative Example D was utilized to form Comparative Example J, Comparative Example E was utilized to form Comparative Example K, and Comparative Example F was utilized to form Comparative Example L. Any amount reported in the following Table 1 and Table 2 is expressed as parts by weight.

TABLE 1

| | Example 1 | Example 2 | Example 3 |
|---|---|---|---|
| VORANOL ™ RN 482 | 64.30 | 64.30 | 64.30 |
| TERCAROL ™ 5902 | 13.00 | 13.00 | 13.00 |
| VORANOL ™ CP 1055 | 7.00 | 7.00 | 7.00 |
| VORANOL ™ RA 640 | — | — | — |
| Tris (1-chloro-2-propyl) phosphate | 10.70 | 10.70 | 10.70 |
| POLYCAT ® 8 | 0.24 | 0.4 | — |
| POLYCAT ® 5 | 0.96 | 0.75 | 1.03 |

TABLE 1-continued

|  | Example 1 | Example 2 | Example 3 |
|---|---|---|---|
| DABCO ® TMR-30 | 0.40 | 0.40 | 0.40 |
| TEGOSTAB ® B 8496 | 2.00 | 2.00 | 2.00 |
| Water | 1.40 | 1.40 | 1.40 |
| Cyclopentane | 13.00 | 13.00 | 13.00 |
| VORATEC ™ SD100 | 132 | 132 | 132 |

TABLE 2

|  | Comparative Example A | Comparative Example B | Comparative Example C | Comparative Example D | Comparative Example E | Comparative Example F |
|---|---|---|---|---|---|---|
| VORANOL ™ RN 482 | 64.30 | 64.30 | 55.70 | 55.70 | 55.70 | 64.30 |
| TERCAROL ™ 5902 | 13.00 | 13.00 | — | — | — | 13.00 |
| VORANOL ™ CP 1055 | 7.00 | 7.00 | 22.00 | 22.00 | 22.00 | 7.00 |
| VORANOL ™ RA 640 | — | — | 3.00 | 3.00 | 3.00 | — |
| Tris (1-chloro-2-propyl) phosphate | 10.00 | 10.00 | 14.00 | 14.00 | 14.00 | 10.00 |
| POLYCAT ® 8 | 0.90 | 0.90 | 2.04 | 1.20 | 1.20 | 1.55 |
| POLYCAT ® 5 | 0.45 | 0.45 | — | 0.60 | 0.60 | — |
| DABCO ® TMR-30 | 0.40 | 0.40 | 0.48 | 0.48 | 0.48 | 0.40 |
| TEGOSTAB ® B 8496 | 2.00 | 2.00 | 2.00 | 2.00 | 2.00 | 2.00 |
| Water | 1.40 | 1.40 | 1.40 | 1.40 | 1.40 | 1.40 |
| Cyclopentane | 13.00 | 13.00 | 13.00 | 13.00 | 13.00 | 13.00 |
| VORATEC ™ SD100 | 132 | 132 | 132 | 128 | 128 | 128 |

Various properties were determined for a number of the Examples and/or Comparative Examples discussed herein.

Minimum fill density, which is dependent upon the in-mold pressure, was determined as a quotient of a minimum mass of foam formulation to fill the mold to 95 percent and a volume of the mold. Minimum fill densities are reported in Table 3.

TABLE 3

|  | Minimum fill density (grams/liter) |
|---|---|
| Example 1 | 37.80 |
| Example 2 | 37.90 |
| Example 3 | 38.50 |
| Comparative Example A | 37.03 |
| Comparative Example C | 37.33 |
| Comparative Example D | 38.30 |
| Comparative Example F | 39.19 |

Mold density was determined as a quotient of a mass of a foam panel and a volume of the mold. Mold densities are reported in Table 4.

TABLE 4

|  | Mold density (grams/liter) |
|---|---|
| Example 4 | 41.30 |
| Example 5 | 41.80 |
| Example 6 | 42.30 |
| Comparative Example G | 40.50 |
| Comparative Example I | 41.38 |
| Comparative Example J | 42.52 |
| Comparative Example L | 43.28 |

Thermal conductivity was determined for respective foam panels at an average plate temperature of 10° C. according to ISO 12939-01/DIN 52612 by utilizing a Lasercomp FOX 200. Thermal conductivities are reported in Table 5.

TABLE 5

|  | Thermal conductivity (milliwatts/meter · kelvin) |
|---|---|
| Example 4 | 19.61 |
| Example 5 | 19.60 |
| Example 6 | 19.70 |
| Comparative Example G | 19.80 |
| Comparative Example I | 20.41 |

TABLE 5-continued

|  | Thermal conductivity (milliwatts/meter · kelvin) |
|---|---|
| Comparative Example J | 20.72 |
| Comparative Example L | 20.02 |

The data in Table 5 show that each of Examples 4-6 has a thermal conductivity of less than 20 milliwatts/meter kelvin. Also, the data in Table 5 show that each of Examples 4-6 has an improved thermal conductivity, as compared to each of Comparative Examples G, I, J, and L.

Average cell diameter was determined for respective foam panels by PORE! SCAN analysis (Goldlücke Ingenieurleistungen). Average cell diameters are reported in Table 6.

TABLE 6

|  | Average cell diameter (microns) |
|---|---|
| Example 4 | 228.2 |
| Example 5 | 169.1 |
| Example 6 | 211.9 |
| Comparative Example G | 303.0 |
| Comparative Example I | 298.4 |
| Comparative Example J | 335.6 |
| Comparative Example L | 293.6 |

The data in Table 6 show that each of Examples 4-6 has average cell diameter of less than 250 microns. Also, the data in Table 6 show each of Examples 4-6 has an improved average cell diameter, as compared to each of Comparative Examples G, I, J, and L.

Example 7, a rigid polyurethane foam panel, was formed as Example 4 with the changes that a jumbo mold (70 cm long, 35 cm wide and 10 cm deep) was utilized rather than the Brett mold and 115 percent of a minimum fill density of 38.00 grams/liter of Example 1 was injected into the jumbo mold. Examples 8-9, rigid polyurethane foam panels, were formed as Example 7. However, Examples 8-9 utilized Examples 2-3, respectively, in place of Example 1.

Similarly. Comparative Example M was formed by utilizing Comparative Example B, and Comparative Example N was formed by utilizing Comparative Example E.

Each of Examples 7-9 and Comparative Examples M and N were demolded, i.e. removed from respective molds, ten minutes after the foam formulations were completely injected into the mold. Post-expansion was determined twenty four hours after the demolding for each of Examples 7-9 and Comparative Examples M and N. Post expansion values, determined as maximum thickness percent change for the interval from demolding to twenty four hours, are reported in Table 7.

TABLE 7

|  | Maximum thickness percent change |
|---|---|
| Example 7 | +4.10% |
| Example 8 | +3.90% |
| Example 9 | +4.10% |
| Comparative Example M | +4.20% |
| Comparative Example N | +4.74% |

The data in Table 7 show that each of Examples 7-9 has a lower maximum thickness percent change as compared to both Comparative Examples M and N. This lower maximum thickness percent indicates that each of Examples 7-9 has an improved curing, e.g. a faster curing, as compared to both Comparative Examples M and N. The improved curing is surprising because each of Examples 7-9 was formed from foam formulations, i.e. Examples 1-3, which have high blowing catalyst to gel catalyst ratio, as compared to either of Comparative Examples B or E, which were utilized form Comparative Examples M and N, respectively.

The invention claimed is:

1. A foam formulation comprising:
   a polyol composition consisting essentially of an amine-initiated polyol that is from 10 percent to 20 percent of a total weight of the polyol composition and an additional polyether polyol that is from 80 percent to 90 percent of the total weight of the polyol composition, wherein the additional polyether polyol includes a trifunctional polyol that is less than 10 percent of the total weight of the polyol composition, wherein the amine-initiated polyol has an average hydroxyl number from 200 to 850;
   a polyisocyanate, wherein the foam formulation has an isocyanate index in a range from 70 to 500;
   a blowing agent;
   a blowing catalyst comprising pentamethyldiethylene-triamine; and optionally
   a gel catalyst comprising dimethylcyclohexylamine, wherein a combination of the blowing catalyst and the gel catalyst is from 0.5 percent to 1.5 percent the total weight of the polyol composition and wherein the blowing catalyst is from 60 percent to 100 percent of a total weight of the blowing catalyst and the gel catalyst.

2. The foam formulation of claim 1, wherein the combination of the blowing catalyst and the gel catalyst is from 0.5 percent to 1.3 percent the total weight of the polyol composition.

3. The foam formulation of claim 1, further comprising a trimerization catalyst selected from the group consisting of 1,3,5-tris(N,N-dimethylaminopropyl)-s-hexahydrotriazine, [2,4,6-Tris (dimethylaminomethyl) phenol], sodium hydroxide, tetramethylammonium hydroxide, sodium methoxide, potassium isopropoxide and combinations thereof.

4. The foam formulation of claim 3, wherein the trimerization catalyst is from 0.1 percent to 1.5 percent of a total weight of the polyol composition.

5. A rigid polyurethane foam formed by curing the foam formulation of claim 1.

6. The rigid polyurethane foam of claim 5, wherein the rigid polyurethane foam has a thermal conductivity of less than 20 milliwatts/meter kelvin.

7. The rigid polyurethane foam of claim 5, wherein the rigid polyurethane foam has an average cell diameter from 175 microns to 250 microns.

8. A method for forming a foam formulation comprising:
   forming a polyol composition consisting essentially of an amine-initiated polyol that is from 10 percent to 20 percent of a total weight of the polyol composition and an additional polyether polyol that is from 80 percent to 90 percent of the total weight of the polyol composition by combining the amine-initiated polyol and the additional polyether polyol, wherein the additional polyether polyol includes a trifunctional polyol that is less than 10 percent of the total weight of the polyol composition, wherein the amine-imitated polyol has an average hydroxyl number from 200 to 850; and
   combining the polyol composition with a polyisocyanate to provide an isocyanate index in a range from 70 to 500, a blowing agent, a blowing catalyst comprising pentamethyldiethylene-triamine, and optionally a gel catalyst comprising dimethylcyclohexylamine to form the foam formulation, wherein a combination of the blowing catalyst and the gel catalyst is from 0.5 percent to 1.5 percent the total weight of the polyol composition and wherein the blowing catalyst is from 60 percent to 100 percent of a total weight of the blowing catalyst and the gel catalyst.

9. The method of claim 8, further comprising injecting the foam formulation into a mold having a reduced atmospheric pressure that is from 350 to about 950 millibars.

* * * * *